(12) United States Patent
Mondal et al.

(10) Patent No.: US 11,238,202 B2
(45) Date of Patent: Feb. 1, 2022

(54) VERIFYING GLITCHES IN RESET PATH USING FORMAL VERIFICATION AND SIMULATION

(71) Applicant: Synopsys, Inc., Mountain View, CA (US)

(72) Inventors: Sudeep Mondal, Noida (IN); Paras Mal Jain, Cupertino, CA (US); Anshul Tuteja, Rhodes (AU)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/910,953

(22) Filed: Jun. 24, 2020

(65) Prior Publication Data

US 2020/0401750 A1 Dec. 24, 2020

(30) Foreign Application Priority Data

Jun. 24, 2019 (IN) .............................. 201911025023

(51) Int. Cl.
*G06F 30/33* (2020.01)
*G06F 30/3308* (2020.01)
(Continued)

(52) U.S. Cl.
CPC ........ *G06F 30/3308* (2020.01); *G06F 30/323* (2020.01); *G06F 30/3323* (2020.01); *G06F 2119/12* (2020.01)

(58) Field of Classification Search
CPC ...... G06F 30/33; G06F 30/30; G06F 2111/02; G06F 2115/10; G06F 8/20; G06F 8/41; G06F 8/53; G06F 11/26; G06F 30/3323; G06F 2117/08; G06F 30/327; G06F 30/331; G06F 30/34; G06F 8/34; G06F 9/4494; G06F 11/3644; G06F 2111/12; G06F 2115/08; G06F 30/31; G06F 30/39; G06F 30/333; G06F 2111/10; G06F 16/212; G06F 16/26; G06F 2111/04; G06F 2111/20; G06F 2119/18; G06F 3/048; G06F 30/13; G06F 9/44; G06F 30/3308; G06F 30/337; G06F 30/367; G06F 30/373; G06F 30/398; G06F 16/211; G06F 16/245; G06F 2201/80;
(Continued)

(56) References Cited

U.S. PATENT DOCUMENTS

| 7,412,674 | B1 * | 8/2008 | Singhal | G06F 30/3323 716/106 |
| 2008/0028347 | A1 * | 1/2008 | Hiraoglu | G06F 30/3323 716/103 |

(Continued)

*Primary Examiner* — Binh C Tat
(74) *Attorney, Agent, or Firm* — Sterne, Kessler, Goldstein & Fox P.L.L.C.

(57) ABSTRACT

A method and a system for identifying glitches in a circuit are provided. The method includes identifying a sub-circuit that drives a net from a plurality of nets in a circuit, generating a glitch detection circuit comprising dual-rail encoding from the net to a signal driver of the sub-circuit, modifying the sub-circuit to include the glitch detection circuit, generating an optimized hardware design language (HDL) output file associated with the glitch detection circuit and the sub-circuit, and performing a simulation or a formal verification of the optimized HDL output file to determine whether a signal associated with the net glitches.

19 Claims, 8 Drawing Sheets

(51) Int. Cl.
*G06F 30/323* (2020.01)
*G06F 30/3323* (2020.01)
*G06F 119/12* (2020.01)

(58) Field of Classification Search
CPC .... G06F 30/35; G06F 9/3869; G06F 2119/06; G06F 2119/12; G06F 2119/22; G06F 30/323; G06F 30/36; G01R 31/318357; G01R 31/318364; G01R 31/31704; G01R 31/31705; G01R 31/317
USPC .................................................. 716/100–108
See application file for complete search history.

(56) References Cited

U.S. PATENT DOCUMENTS

| | | | | |
|---|---|---|---|---|
| 2009/0288059 | A1* | 11/2009 | Dimou | G06F 30/35 716/104 |
| 2011/0184713 | A1* | 7/2011 | Yang | G06F 30/33 703/13 |
| 2018/0018417 | A1* | 1/2018 | Iyer | G06F 30/30 |

* cited by examiner

VERIFYING GLITCHES IN RESET PATH USING FORMAL VERIFICATION AND SIMULATION

CROSS-REFERENCE TO RELATED APPLICATIONS

The present application claims the benefit of Indian Patent Application No. 201911025023, filed on Jun. 24, 2019, which is incorporated herein by reference in its entirety for all purposes.

TECHNICAL FIELD

The present disclosure relates generally to an electronic design automation (EDA) system. In particular, the present disclosure relates to verifying glitches in formal verification and simulation.

BACKGROUND

A glitch is a relatively short duration pulse within a digital circuit design that often offsets itself, making it hard to detect and fix. Furthermore, some glitches on a reset pin of a flip-flop may result in a metastable state. For example, an active-low reset on the flip-flop may or may not result in a metastable state assuming that signals on data and clock pins of the flip-flop are stable when the reset pin undergoes transitions. A positive glitch of form "0-1-0" on the reset pin may not result in a metastable state since after the transient transition to 1, the flip-flop returns to the reset state of 0, although it may crop a momentary output of 1 on a Q-pin of the flip-flop. It is noted that a "0" refers to a relatively low voltage level (e.g., a ground voltage), while "1" refers to a relatively high voltage level (e.g., a supply voltage).

However, a negative glitch of form "101" on the reset pin may cause metastable behavior because the flip-flop can be in two possible states after the glitch. The flip-flop can have either a 0 state if the glitch was long enough to cause the flip-flop to reset its value, or a state of 1 if the glitch was too short-lived for the flip-flop to reset its value.

SUMMARY

In one aspect, a method includes identifying, by at least one computer processor, a sub-circuit that drives a net from a plurality of nets in a circuit, generating a glitch detection circuit comprising dual-rail encoding from the net to a signal driver of the sub-circuit, modifying, by the at least one computer processor, the sub-circuit to include the glitch detection circuit, generating an optimized hardware design language (HDL) output file associated with the glitch detection circuit and the sub-circuit, and performing a simulation or a formal verification of the optimized HDL output file to determine whether a signal associated with the net glitches.

In one aspect, a system includes a memory storing instructions, and a processor, coupled with the memory and to execute the instructions. The instructions when executed cause the processor to identify a sub-circuit that drives a net from a plurality of nets in a circuit, generate a glitch detection circuit comprising dual-rail encoding from the net to a signal driver of the sub-circuit, modify the sub-circuit to include the glitch detection circuit, generate an optimized HDL output file associated with the glitch detection circuit and the sub-circuit, and perform a simulation or a formal verification of the optimized HDL output file to determine whether a signal associated with the net glitches.

In one aspect, a method includes identifying, by at least one computer processor, a sub-circuit that drives a net from a plurality of nets in a circuit, generating an abstract port for a signal driver of the sub-circuit when the signal driver is associated with a primary port of the circuit, generating a glitch detection circuit comprising dual-rail encoding from the net to the signal driver of the sub-circuit, modifying the sub-circuit to include the glitch detection circuit, and performing a simulation or a formal verification of the output file to determine whether a signal associated with the net glitches.

Further features of the present disclosure, as well as the structure and operation of various embodiments, are described in detail below regarding the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to modeling and identifying glitches in a circuit using functional techniques. The present system and method includes a monitor circuit in addition to an original (possibly glitching) sub-circuit and extracts a resultant circuit out in terms of a modeled hardware design language (HDL) file (e.g., a Verilog file). The Verilog file can then be evaluated in simulation or through formal verification tools to evaluate whether the original sub-circuit had a glitch. A designer might be interested in finding whether any signal in a circuit design can have a glitch of the form "0-1-0" or "1-0-1."

The present system and method further generates a logical equation that evaluates to 1 when there is a glitch of the format specified by the user or 0 otherwise, although one skilled in the relevant arts will appreciate that these results may be inverted while remaining consistent with the disclosure. The logical equation is in the form of a Verilog module, with no clocks or sequential elements. Outside of the Verilog module, the present system and method also provides clock names for the relevant inputs and their corresponding mappings to actual Register Transfer Level (RTL) signals, allowing users to easily instantiate the Verilog module in a System Verilog assertion for simulation.

A functional expression generated by these approaches provides a result that can identify a glitch. In other words, the logical equation evaluates to 1 if there is some delay for the wires and gates that causes the specified glitch. The disclosed dual-rail model for identifying glitches provides a complete solution for evaluating glitches in a reset path. The approaches described herein are suitable for all kinds of circuits.

In one embodiment, the cases under which input changes at the input of the reset pin and can result in a "1-0-1" glitch are determined for an active-low reset pin of a flip-flop.

Two values, formally known as dual-rail, are used on input to indicate its previous and current value. For example, a value of 10 on a signal indicates that the previous value of the input was 1 and the current value is 0.

Figure 1:
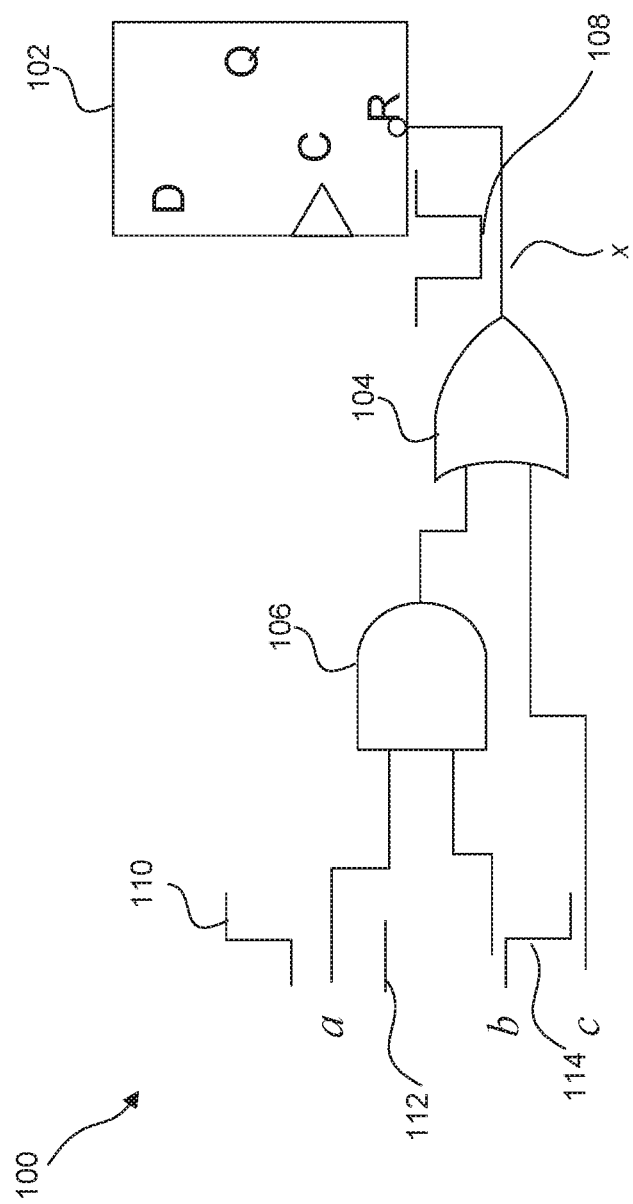
FIG. 1 illustrates an example circuit, in accordance with an embodiment of the present disclosure.

FIG. 1 illustrates an example circuit, in accordance with an embodiment of the present disclosure. A circuit 100 includes a flip-flop 102. The active-low reset pin R of the flip-flop 102 may be input using a signal x. Inputs to the circuit 100 includes a, b, and c. An AND gate 106 receives inputs a and b. The output of the AND gate 106 is connected to an input of an OR gate 104. The input c is also connected to an input of the OR gate 104. An output of the OR gate 104 provides signal x connected to a reset pin of the flip flop 102.

The transitions of circuit 100 of FIG. 1 and corresponding glitch analysis of the circuit are shown in Table 1. The first row of Table 1 corresponds to the transitions indicated in FIG. 1 (i.e., signal 110 at input a, signal 112 at input b, and signal 114 at input c, and signal 108 at output x).

TABLE 1

| state for circuit 100 | | | |
|---|---|---|---|
| a | b | c | x |
| 01 | 11 | 10 | "101" glitch |
| 11 | 11 | 01 | No glitch |
| 01 | 10 | 11 | No glitch |
| 01 | 10 | 00 | "010" glitch |

In one embodiment, input signal a transitions from a 0 state to 1 state as shown by signal 110. Input signal b may have a 1 state as shown by signal 112 and input signal c may transition from 1 to 0 as shown by signal 114. The states for a, b, and c correspond to the first row of table 1. The functional expression evaluates to 1 for row 1 of table 1 in case it is feeding an active low reset. The functional expression evaluates to 1 for both rows 1 and 4 of Table 1 if the user-specified R to be analyzed for both "010" and "101" glitches. It is noted that the equation may evaluate to 1 on other input transitions not shown in FIG. 1.

A dual-rail model represents a 3-valued state space (0, 1, and X) through Boolean values, which by definition can represent only 2 values. X may be referred to as NULL state. By using two bits (commonly called as a high rail and a low rail), the state space can be represented as shown in Table 2.

TABLE 2

| dual-rail model representation | | |
|---|---|---|
| High Rail | Low Rail | Representation |
| 1 | 0 | 1 |
| 0 | 1 | 0 |
| 1 | 1 | X |
| 0 | 0 | X |

Figure 2:
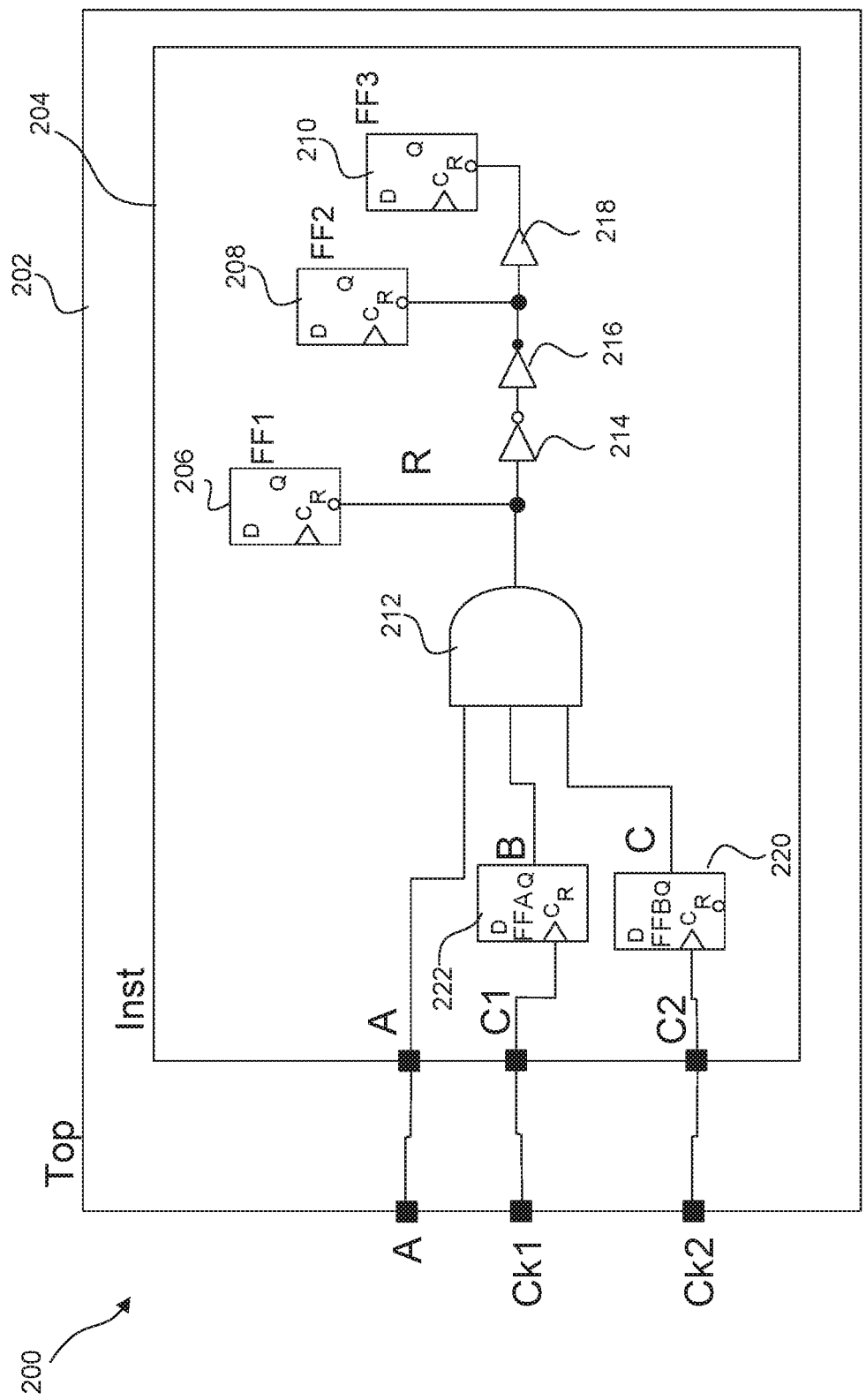
FIG. 2 illustrates another example circuit, in accordance with an embodiment of the present disclosure.

FIG. 2 illustrates another example circuit, in accordance with an embodiment of the present disclosure. A circuit 200 includes an instance module 204 (or instance level) that includes a flip-flop FF1 206, a flip-flop FF2 208, a flip-flop FF3 210, an AND gate 212, a flip-flop FFA 222, a flip-flop FFB 220, a first inverter 214, a second inverter 216, and a third inverter 218. An output of the AND gate 212 is coupled to a reset pin of the flip-flop FF1 206. The AND gate 212 has a first input coupled to a primary input A, a second input coupled to an output B of the flip-flop FFA 222, and a third input coupled to an output C of the flip-flop FFB 220. The output of the AND gate 212 is coupled to the first inverter 214. The output of the first inverter 214 is coupled to an input of the second inverter 216. The output of the second inverter 216 is coupled to the reset pin of the flip-flop FF2 208 and to an input of the third inverter 218. The output of the third inverter 218 is coupled to a reset pin of the flip-flop FF3 210. A top entity 202 includes primary input A, a first clock Ck1, and a second clock Ck2. The first clock CK1 is coupled to the input of the flip-flop FFA 222 and the second clock Ck2 is coupled to the flip-flop FFB 220.

Figure 3:
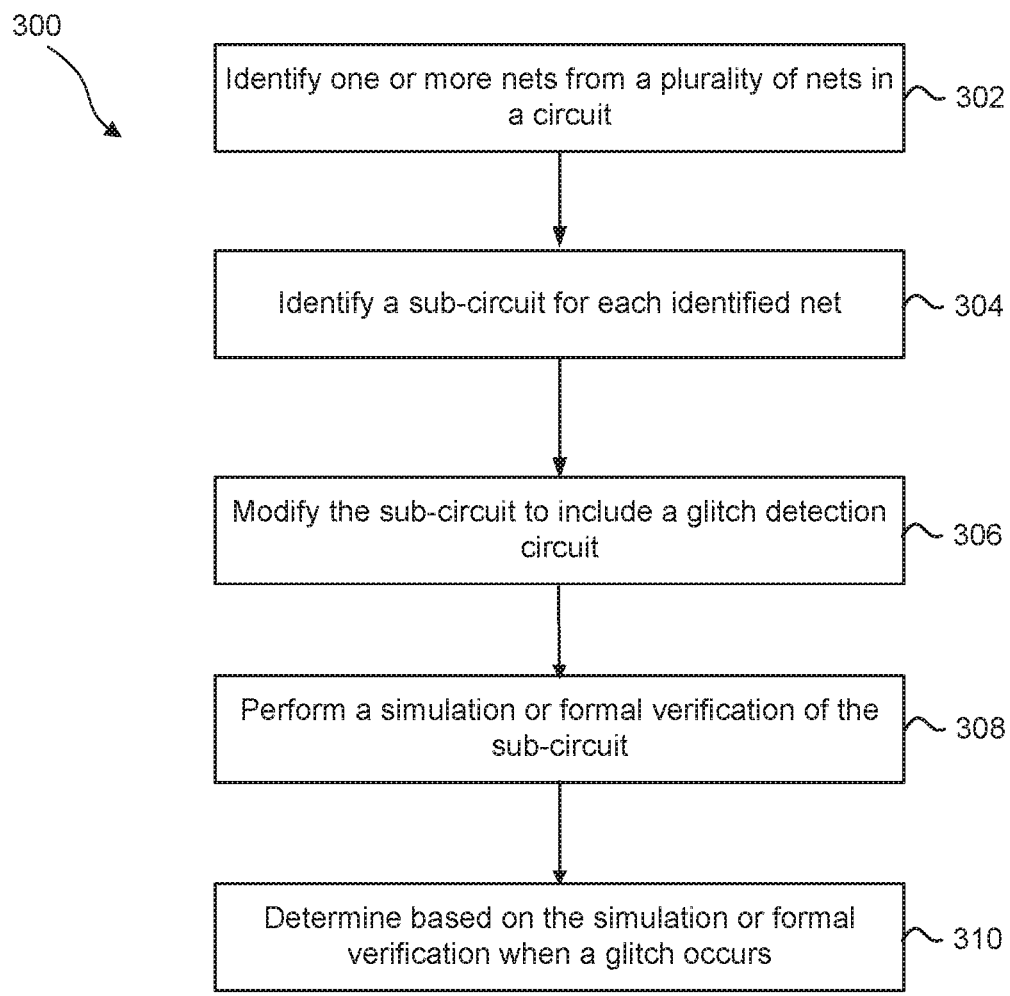
FIG. 3 illustrates a flowchart of a method for identifying glitches in reset paths, in accordance with an embodiment of the present disclosure.

FIG. 3 illustrates a flowchart of a method for identifying glitches in reset paths, in accordance with an embodiment of the present disclosure. In one embodiment, the methodology shown in FIG. 3 is implemented with reference to the circuit 200 shown in FIG. 2. At 302, nets to be analyzed for glitch are identified. In one aspect, the nets to be analyzed include one or more nets connected to asynchronous reset/set pins of flip-flops (e.g., a clear pin, a preset pin) In one embodiment, clock paths may be identified to be analyzed for glitch.

At 304, a sub-circuit associated with each of the nets is identified. For example, net R is a net connected to the asynchronous reset of the flip-flop FF1 206, and may be identified as a net to be analyzed. For each net (e.g., net R) identified in 302, a sub-circuit is identified. The sub-circuit is a portion of the circuit that includes all drivers (stop-points) in terms of which a glitch-detection (monitor) function is a function of.

In one aspect, the drivers include flip-flops, primary inputs, bbox-outputs ports (Bbox refers to blackbox). The fanin traversal stops at flip-flops, primary inputs and blackboxes. In other words, the driver for a glitch model is either a flop output, a primary input, or a black box output pin.

In one aspect, the drivers also include nets that have other constraints (e.g., set_case_analysis, quasi_static, a clock, a reset) and primary inputs with no constraints. Set_case_analysis constraint may be used to define the case when a net is stuck to a particular value. Quasi_static constraint may be used to define a net which changes very less and is mostly static (e.g., mode selection signals or configuration signals). If a driver has an input/abstract_port constraint, then a flip-flop is introduced in order to model its previous driver.

At 306, the sub-circuit is modified to include a glitch detection circuit based on a functional expression. For example, for each sub-circuit identified at 304, a functional expression is generated. The following transitions may be assumed in generating the functional expression.

If an input/abstract_port is defined for a primary input, a flop is created clocked by the corresponding clock. The input to the flop can take {00, 11, 01, 10}. The input/abstract_port constrains a primary input (PI) to toggle with respect to a clock edge. So, if for example, the user declares an input port constraint on port P and clock CLK1, then internally port P is modelled by adding a flop to port P. The clock net of the flop is CLK1. Thus, the output of the flop (which is P in the newly modeled circuit) is bound to change only when a positive edge of CLK1 is received. The other drivers (i.e., remaining PIs/bbox outputs) may have any value from the set {00, 11, 01, 10}.

In one implementation, customization options may be provided to the user to indicate if any particular transition/set of transitions is not possible or allowed.

The sub-circuit is modified to include a glitch-detection expression (e.g., in the form of a Verilog file) that checks whether signal R can glitch by way of monitoring the sub-circuit during simulation.

Figure 4A:
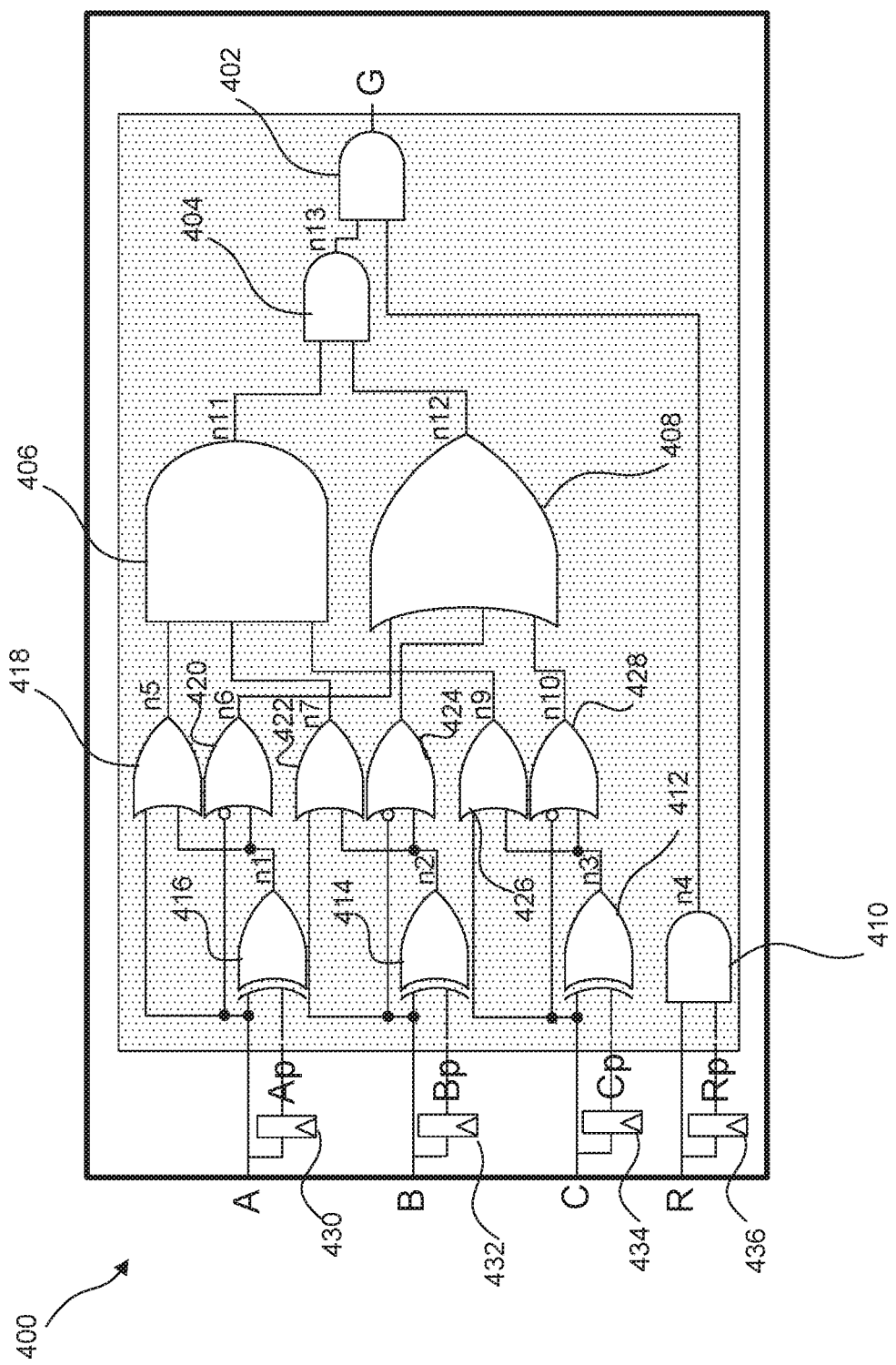
FIG. 4A illustrates an example diagram of glitch expression modeling, in accordance with an embodiment of the present disclosure.

In one embodiment, for each of the inputs d1, . . . , dn and for R, a delayed variable is created. For example, in FIG. 2, input signals A, B, C and signal R are relevant. In other words, the glitch analysis is based on the input signals A, B, C and signal R. The glitch-detection expression is a function of the input signals A, B, C and signal R. Eight variables A, Ap, B, Bp, C, Cp, R and Rp are created (p denotes previous). Ap, Bp, Cp, and Rp represent the previous cycle values of A, B, C, and R respectively. Change in each variable is encapsulated. For example, a XOR gate may be inserted between A and Ap as shown in FIG. 4A. The XOR gate generates an output of 1 if there is a change between a variable and the previous cycle value of the variable (e.g., between A and Ap).

In one embodiment, when modeling for internal formal verification, each of the delayed signals is the output of a flip-flop whose clock is a clock of a corresponding signal (for R and Rp, the clock with all edges of clkA, clkB, and clkC are used). clkA, clkB and clkC are the clocks used in the modeling of Ap, Bp and Cp respectively. For example, Ap requires clkA, Bp requires clkB, and Cp requires clkC. Since R is a function of A, B and C, hence Rp requires all three clocks. To model the previous value of any driver, a flip-flop is introduced. The flip-flop is clocked using the driver's clock. If the driver is a primary clock, there would be no clock (actually, a verification clock). If the driver is a flip-flop output or a primary input with input/abstract_port constraint, then the flip-flop is clocked by the same clock net as discussed below. In FIG. 2, A may receive clkA that is a verification clock (fastest running clock in the design) since A is a primary input. The verification clock represents the fastest clock in the design. CK1 may receive clkB, and Ck2 may receive clkC.

The abstractport constraint is used to associate a primary input to a clock. This can be used to clock the previous value. Abstract-port constraint may be implemented when the analysis is performed at a block level and logic coming from outside the block level has been abstracted or removed. For example, if a flip-flop is clocked by clock CLK1 and is driving the input port P1 of a block, then during block level analysis an abstract_port constraint is defined on P1 so that the tool toggles or changes values only at a positive edge of clock CLK1.

For the glitch model having glitch drivers as A, B and C, the previous cycle values, denoted by Ap, Bp and Cp are modeled. The modeling may be implemented using a delay element or a flip-flop between A and Ap. However, if A is a primary port, then the clock of the delay element may not be known. Thus, the abstract_port constraint enables the user to associate a clock to a primary port. This would help model Ap from A more accurately.

The abstracted block may not have access to an original top level clock. In such cases, an abstract_port constraint can be applied on a primary port but with a virtual clock tag. As discussed previously herein, the previous cycle values Ap, Bp and Cp are modeled for the glitch drivers A, B and C. The delay element can be inserted in order to perform the modeling, and the clock of the delay element may be clocked by the virtual clock. However, since the clock is virtual (i.e., does not exist in real design), the fastest running clock in the design is considered to be the clock for the delay element.

Then, a dual-rail encoding may be performed for logic from R to its drivers found in step 304. The input values to the dual-rail circuit are provided as follows: X (1,1 in dual-rail) when the previous value of the input is different than the current value (i.e., if prev value !=current value), 0 (0,1 in dual-rail) when the previous value is equal to the current value and the value is equal to zero (i.e., if prev value==current value==0), and 1 (1,0 in dual-rail) when the previous value is equal to the current value is equal to one. (i.e., if prev value==current value==1).

In one embodiment, when a primary input with 010 allowed, the current value is equal to the previous value, and the value is equal to one, then the input is set to X (1,1 in dual-rail). When a primary input with 101 is allowed, a current value is equal to the previous value, and the value is equal to one, then the input value is set to X (1,1 in dual-rail).

The circuit has a 010 glitch if X results on the output of the dual-rail circuit and the previous value is equal to the current value and the value is equal to zero (i.e., prev(n1)==current(n1)==0). The circuit has a 101 glitch when X results on the output of the dual-rail circuit and the previous value is equal to the current value equals to one. (i.e., prev(n1)==current(n1)==1).

At 308, simulation or formal verification of the circuit is performed. For example, a simulation of the modified sub-circuit is performed to determine whether a signal associated with the identified net glitches. Inputs are provided to the modified component signal drivers as described later herein. Further, files and/or reports may be generated. In one embodiment, a file/report including a spreadsheet having at least three columns is generated. A first column may include flip-flops with reset/set that requires glitch monitoring. A second column may include a list of the nets (e.g., "R") that are analyzed for glitch. A third column may include a location of the Verilog file and/or the optimized Verilog file associated with the circuit.

A Verilog module describing the glitch equation may be generated with two inputs per drivers of a cone (e.g., identified at step 304). A first input corresponds to the current value and a second input corresponds to the previous value. The Verilog module may also include one output corresponding to the glitch condition.

At 310, a time when the glitch has occurred is determined based on a final value of the output. In the circuit 200, the flip-flop FF1 206, the flip-flop FF2 208, and the flip-flop FF3 210 have the same reset driver, so a glitch expression that models the 101 glitch condition is generated since the reset on the flip-flops is active high.

In one example, if a glitchy reset reaches multiple flip-flop clear pins (e.g., the FF1 206, the FF2 208, and the FF3 210), the glitch analysis is performed only once for them. Thus, the same result occurs if circuit 200 of FIG. 2 includes only FF1 206 (and not FF2 208/FF3 210). Drivers for net R are identified. Signal A is a primary input because it can be declared in a top level 206. Since A is a primary input, its behavior is assumed to be one from the set {00,11, 01,10} and thus cannot glitch. The flip-flops FFA 222 and FFB 220 are identified as the drivers of signals B and C. The flip-flops FFA 222 and FFB 220 are controlled by top clock signals Ck1 and Ck2 as shown in FIG. 2.

In addition, since A is a primary input, if no input/abstract_port constraint (that define the clock behavior of A) is defined, no clock mapping is provided for A. That is, the clock net of the flop that is added to model the previous element (notice the flop between A and Ap) will be different for the different drivers. For A, it will be the verification clock, for B it will be Ck1 and for C it will be Ck2. The possible values for {signal, signal previous} are from the following set {00, 01, 11, 10}. So, the possible transitions are amongst this set of values.

Figure 4B:
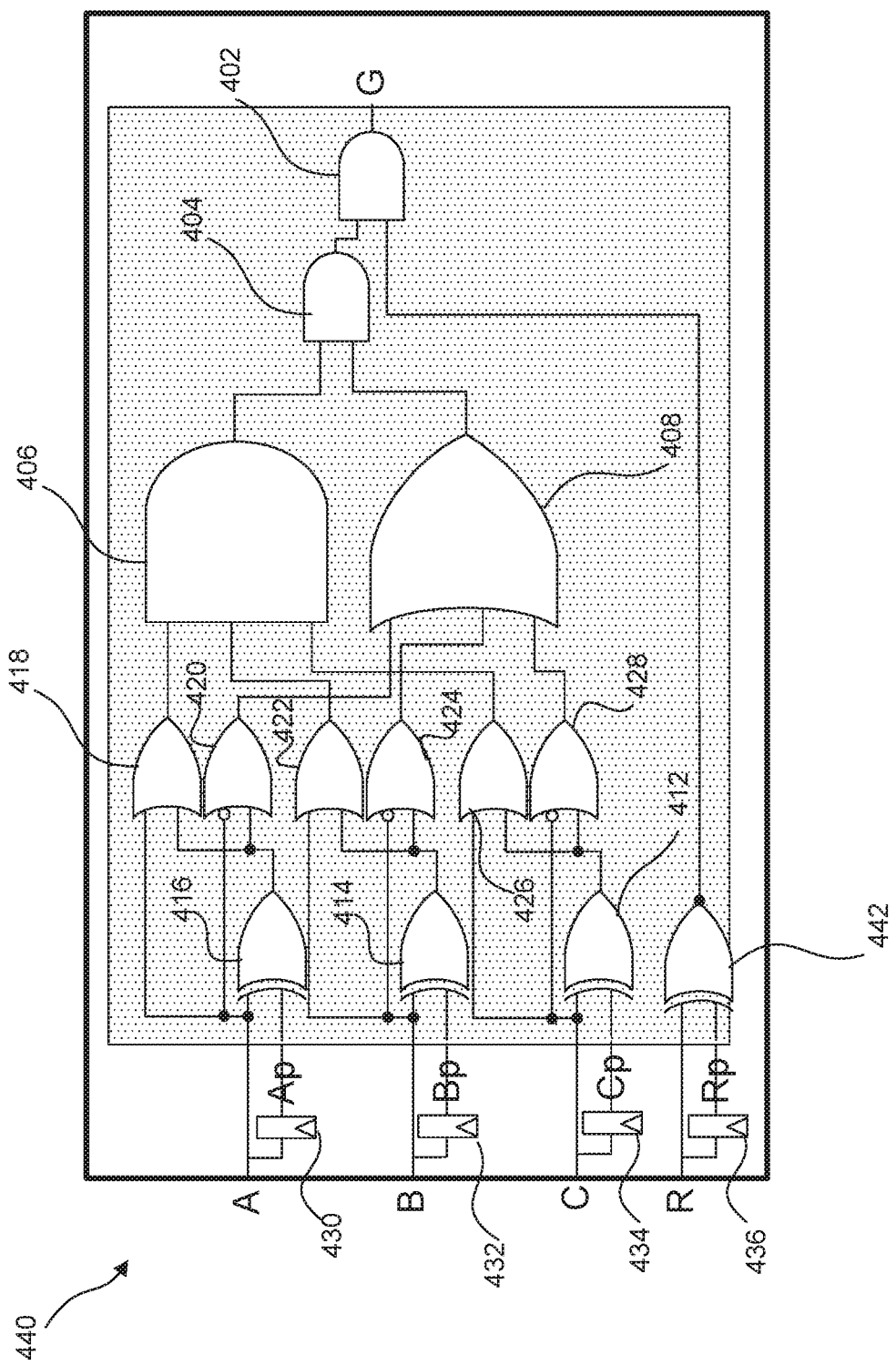
FIG. 4B illustrates an example diagram of a modified glitch modeling circuit, in accordance with an embodiment of the present disclosure.

Exemplary dual-rail models configured to check for 101 and 010 glitches are depicted in FIG. 4A and 4B respectively. The glitch expression modeling 101 glitch is shown in FIG. 4A. A Verilog file is generated corresponding to FIG. 4A. The Verilog file generation is further described later herein.

The circuit design, thus modified to include the glitch modeling circuit is then subject to simulation in which applied input data generates associated values A, B and C and corresponding net value R.

FIG. 4A illustrates an example diagram of glitch expression modeling, in accordance with an embodiment of the present disclosure. Flip-flops 430, 432, 434, and 436, provides variables Ap, Bp, Cp, and Rp which corresponds to the previous state values of A, B, C, and R, respectively as described previously herein. In one embodiment, a change in the state value of a variable may be captured using a different technique. For example, a XOR gate may be used between a delayed value of A and A.

Using dual-rail encoding, 0 is encoded as (0,1), 1 is encoded as (1,0) and X is encoded as (1,1), as shown in Table 2. AND(a0a1,b0b1) corresponds to AND(a0,a1), OR(a0, a1). OR(a0a1, b0b1)=OR(a0,a1), AND(a1,b1). NOT (a0a1)=a1a0. It is noted that for dual-rail modeling purpose, this may be sufficient since every Boolean gate can be represented as a combination of OR/AND, NOT gates.

In one embodiment, the Verilog model includes three components that combine to detect a 101 glitch occurring at net R: first, a high rail circuit characterized by the AND gate 406 whose output is net n11; second, a low rail circuit characterized by the OR gate 408 in FIG. 4A whose output is net n12; and third, a 101 glitch modeling circuit characterized by the AND gate 410 whose output is net n4. The high rail and low rail circuit portions implement dual-rail modeling of the sub-circuit that generates net value R.

Thus, a first input of the AND gate 406 is coupled to the output of an OR gate 418, a second input of the OR gate 406 is coupled to the output of an OR gate 422, and a third input of the OR gate 406 is coupled to the output of an OR gate 426. A first input of the AND gate 418 is coupled to primary input A and a second input of the AND gate 418 is coupled to an output of an XOR gate 416. A first input of the OR gate 422 is coupled to input B and a second input of the OR gate 422 is coupled to an output of an XOR gate 414. A first input of the OR gate 426 is coupled to input C and a second input of the OR gate 426 is coupled to an output of an XOR gate 412.

For the low rail input, a first input of the OR gate 408 is coupled to an output of an OR gate 420, a second input is coupled to an output of OR gate 424, and a third input is coupled to an output of an OR gate 428. A first input of the OR gate 420 is coupled to input A (negated) and a second input is coupled to the output of the XOR gate 416. A first input of the OR gate 424 is coupled to input B (negated) and a second input is coupled to the output of the XOR gate 414. A first input of the OR gate 428 is coupled to input C (negated) and a second input is coupled to the output of the XOR gate 412. A first input of the XOR gate 416 is coupled to input A and a second input is coupled to Ap (i.e., previous value of input A). A first input of the XOR gate 414 is coupled to input B and a second input is coupled to Bp (i.e., previous value of input B). A first input of the XOR gate 412 is coupled to input C and a second input is coupled to Cp (i.e., previous value of input C).

The 101 glitch modeling circuit is implemented by ANDing signals R and Rp using the AND gate 410 to generate a glitch modeling output net n4. The Verilog module output signal "G" is produced by ANDing the high rail output net n11, the low rail output net n12, and the glitch modeling output net n4. In other words, a first input of an AND gate 402 is coupled to the output of an AND gate 404 (i.e., output of ANDing high rail circuit and low rail circuit) and a second input of the AND gate 402 is coupled to the output of the AND gate 410. With this configuration, Verilog module output signal "G" switches from a de-asserted state (e.g., G=0) to an asserted state (e.g., G=1) when a 101 glitch occurs in the sub-circuit at any time during simulation of the circuit 400, and remains de-asserted (e.g., G=0) when a 101 glitch does not occur in the sub-circuit during simulation.

FIG. 4B illustrates an example diagram of a modified glitch modeling circuit, in accordance with an embodiment of the present disclosure. A glitch modeling circuit 440 detects both 101 and 010 glitch types by way of XNORing signals R and Rp to generate the glitch modeling output net. The glitch modeling circuit 440 includes similar components and devices as glitch modeling circuit 400 of FIG. 4B. The AND gate 410 is replaced by an XNOR gate 442 to allow for the detection for both 101 and 010 glitches.

In yet another embodiment (not shown), a glitch modeling circuit is configured to detect only 010 glitch types by way of ANDing inverted signals NOT-R and NOT-Rp to generate the glitch modeling output net.

In one embodiment, the above-mentioned Verilog files are tool generated (i.e., automatically). The Verilog module output signal G is the net that is checked after simulation of the host circuit design is completed. If Verilog module output signal G switches from '0' to '1' during simulation, then this means that a glitch occurred in the sub-circuit during simulation. The equivalent property for this in formal technology would be F(G==1). Writing this monitor and passing this to a formal verification tool validates the glitch check functionally.

The Verilog modules depicted in FIGS. 4A and 4B use dual-rail modeling. In FIG. 4A, the AND gate 406 whose output is n11 represents the high rail and the OR gate 408 whose output is n12 represents the low rail. The AND gate 404 having output net n13 is the combination of the high and the low rail circuits as described previously herein. Net n13 will be high if a glitch propagates to this point. Finally, an output net n13 of AND gate 404 is ANDed with n4 (which is generated by ANDing signals R and Rp in the example), and if the output of this operation (i.e., Verilog module output signal G) is 1, then it means that a 101-type glitch occurred during simulation that could propagate to the output (i.e., could affect the operation performed by the flip-flop (e.g., FF1 206 of FIG. 2) to which the related "R" signal is applied).

In one embodiment, the circuit 200 shown in FIG. 2 includes an OR gate to receive signals A, B and C instead of the AND gate 212, then n11 (i.e., high rail) is an OR and n12 is an AND (i.e., low rail circuit). N13 is an AND gate because it is there to combine the low and the high rail circuits.

In one embodiment, the Verilog file is encrypted.

In one embodiment, the dual-rail logic used for glitch analysis is modeled at a formal netlist layer. The resultant netlist is generated in the form of a BLIF (Berkeley Logic Interchange Format) file. A tool for sequential synthesis and verification (e.g., ABC utility from Berkeley) may be used to convert the BLIF file to a Verilog file. The file or Verilog model is optimized to reduce the size of the Verilog model. Further, the Verilog model is optimized to be more readable. A resynthesize command may be used to break the netlist and resynthesizes it to generate an optimized Verilog model (e.g., using "resynth" in ABC). The "resynth" command performs Boolean optimizations internally to resynthesize the netlist and create a simpler and smaller version. For example, the Verilog model is optimized from 60 lines to 35 lines.

Since the glitch modeling is done at the formal netlist layer, the node names are internally generated and may be unreadable. In one implementation, the readability of the file is enhanced by segregating the generated Verilog model into four sections (e.g., a driver section, a potential section, a reset section, and a filter glitch region) and following a distinct naming convention for each of the sections as described below.

The driver section includes glitch drivers and their previous values (i.e., A, Ap, B, Bp, C, and Cp). All signals in the driver section follow the convention "<My_reset>_<drivername>" where <My_reset> is the name of the reset net which is being analyzed for glitch, and <drivername> is the name of the driver or its previous value.

The potential change section includes all the nets involved in the dual rail circuits. All signals in the potential change section follow the convention "<My_reset>_PC_<netname>" where <My_reset> is the name of the reset net which is being analyzed for glitch, <netname> is the name of the net and the static string "PC" indicates "Potential Change".

The reset section includes the reset and reset p (previous reset)(e.g., R and Rp). All signals in the reset section follow the convention "<My_reset>_<netname>" where <My_reset> is the name of the reset net which is being analyzed for glitch and <netname> is the name of the net.

The filter glitch region includes the region which combines the potential change section and the reset section. All signals in the filter glitch region follow the convention "<My_reset>_FG_<netname>" where <My_reset> is the name of the reset net which is being analyzed for glitch, <netname> is the name of the net and static string "FG" indicates "Filter Glitch".

For example, a Verilog model before optimization is shown below:

```
module glitch_model_0_0 (
    \fst2slow.C_0 , \fst2slow.C_p_1 , \fst2slow.B_6 , \fst2slow.B_p_7 ,
    \fst2slow.A_12 , \fst2slow.A_p_13 ,
    \fst2slow.reset_DR_OUT_51 , \fst2slow.reset_G_52 );
input \fst2slow.C_0 , \fst2slow.C_p_1 , \fst2slow.B_6 ,
    \fst2slow.B_p_7 , \fst2slow.A_12 , \fst2slow.A_p_13 ;
output \fst2slow.reset_DR_OUT_51 , \fst2slow.reset_G_52 ;
wire n8, n9, n10, n11, n12, n13, n14, n15, n16, n17, n18, n19, n20, n21,
    n22, n23, n24, n25, n26, n27, n28, n29, n30, n31, n32, n33, n35, n36,
    n37, n38, n39, n40, n41, n42, n43, n44, n45, n46, n47, n48, n49, n50,
    n51, n52;
assign n8 = \fst2slow.C_0 | n11;
assign n9 = n10 | n11;
assign n10 = ~\fst2slow.C_0 ;
assign n11 = ~\fst2slow.C_0 ^ ~\fst2slow.C_p_1 ;
assign n12 = \fst2slow.B_6 | n15;
assign n13 = n14 | n15;
assign n14 = ~\fst2slow.B_6 ;
assign n15 = ~\fst2slow.B_6 ^ ~\fst2slow.B_p_7 ;
assign n16 = \fst2slow.A_12 | n19;
assign n17 = n18 | n19;
assign n18 = ~\fst2slow.A_12 ;
assign n19 = ~\fst2slow.A_12 ^ ~\fst2slow.A_p_13 ;
assign n20 = n23;
assign n21 = n28;
assign n22 = n20 & n21;
assign n23 = n24 & n25;
assign n24 = n26 & n27;
assign n25 = \fst2slow.C_0 ;
assign n26 = \fst2slow.A_12 ;
assign n27 = \fst2slow.B_6 ;
assign n28 = n29 & n30;
assign n29 = n31 & n32;
assign n30 = \fst2slow.C_p_1 ;
assign n31 = \fst2slow.A_p_13 ;
assign n32 = \fst2slow.B_p_7 ;
assign n33 = n37 & n49;
assign n35 = ~n36;
assign n36 = n40 & n52;
assign n37 = n41 & n45;
assign n38 = ~n37;
assign n39 = ~n40;
assign n40 = n44 & n48;
```

```
    assign n41 = n16;
    assign n42 = ~n41;
    assign n43 = ~n44;
    assign n44 = ~n17;
    assign n45 = n12;
    assign n46 = ~n45;
    assign n47 = ~n48;
    assign n48 = ~n13;
    assign n49 = n8;
    assign n50 = ~n49;
    assign n51 = ~n52;
    assign n52 = ~n9;
    assign \fst2slow.reset_DR_OUT_51 = n33 & n35;
    assign \fst2slow.reset_G_52 = n22 & \fst2slow.reset_DR_OUT_51 ;
endmodule
```

The Verilog model after optimization and readability enhancements as described herein is shown below:

```
module glitch_model_0_0 (
        \fst2slow.C_0 , \fst2slow.C_p_1 , \fst2slow.B_6 , \fst2slow.B_p_7 ,
        \fst2slow.A_12 , \fst2slow.A_p_13 ,
        \fst2slow.reset_DR_OUT_51 , \fst2slow.reset_G_52 );
    input \fst2slow.C_0 , \fst2slow.C_p_1 , \fst2slow.B_6 ,
        \fst2slow.B_p_7 , \fst2slow.A_12 , \fst2slow.A_p_13 ;
    output \fst2slow.reset_DR_OUT_51 , \fst2slow.reset_G_52 ;
    wire \fst2slow.reset_PC_n2 , \fst2slow.reset_PC_n3 ,
        \fst2slow.reset_PC_n5 , \fst2slow.reset_PC_n8 , \fst2slow.reset_PC_n9 ,
        \fst2slow.reset_PC_n11 , \fst2slow.reset_PC_n14,
        \fst2slow.reset_PC_n15 , \fst2slow.reset_PC_n17,
        \fst2slow.reset_FG_n20 , \fst2slow.reset_FG_n21 , \fst2slow.reset_n22 ,
        \fst2slow.reset_FG_n26 , \fst2slow.reset_n27 , \fst2slow.reset_PC_n31 ,
        \fst2slow.reset_PC_n34 , \fst2slow.reset_PC_n35 ,
        \fst2slow.reset_PC_n38 ;
    assign \fst2slow.reset_PC_n2 = \fst2slow.C_0 | \fst2slow.reset_PC_n5 ;
    assign \fst2slow.reset_PC_n3 = ~\fst2slow.C_0 | \fst2slow.reset_PC_n5 ;
    assign \fst2slow.reset_PC_n5 = ~\fst2slow.C_0 ^ ~\fst2slow.C_p_1 ;
    assign \fst2slow.reset_PC_n8 = \fst2slow.B_6 | \fst2slow.reset_PC_n11 ;
    assign \fst2slow.reset_PC_n9 = ~\fst2slow.B_6 | \fst2slow.reset_PC_n11 ;
    assign \fst2slow.reset_PC_n11 = ~\fst2slow.B_6 ^ ~\fst2slow.B_p_7 ;
    assign \fst2slow.reset_PC_n14 = \fst2slow.A_12 | \fst2slow.reset_PC_n17 ;
    assign \fst2slow.reset_PC_n15 = ~\fst2slow.A_12 | \fst2slow.reset_PC_n17 ;
    assign \fst2slow.reset_PC_n17 = ~\fst2slow.A_12 ^ ~\fst2slow.A_p_13 ;
    assign \fst2slow.reset_FG_n20 = \fst2slow.reset_FG_n21 & \fst2slow.reset_FG_n26 ;
    assign \fst2slow.reset_FG_n21 = \fst2slow.reset_n22 & \fst2slow.C_0 ;
    assign \fst2slow.reset_n22 = \fst2slow.A_12 & \fst2slow.B_6 ;
    assign \fst2slow.reset_FG_n26 = \fst2slow.reset_n27 & \fst2slow.C_p_1 ;
    assign \fst2slow.reset_n27 = \fst2slow. A_p_13 & \fst2slow.B_p_7;
    assign \fst2slow.reset_PC_n31 = \fst2slow.reset PC n35 & \fst2slow.reset_PC_n2 ;
    assign \fst2slow.reset_PC_n34 = \fst2slow.reset_PC_n38 & ~\fst2slow.reset_PC_n3 ;
    assign \fst2slow.reset_PC_n35 = \fst2slow.reset_PC_n14 & \fst2slow.reset_PC_n8 ;
    assign \fst2slow.reset_PC_n38 = ~\fst2slow.reset_PC_n15 & ~\fst2slow.reset_PC_n9 ;
    assign \fst2slow.reset_DR_OUT_51 = \fst2slow.reset_PC_n31 & ~\fst2slow.reset_PC_n34
;
    assign \fst2slow.reset_G_52 = \fst2slow.reset_FG_n20 & \fst2slow.reset_DR_OUT_51 ;
endmodule
```

Figure 5:
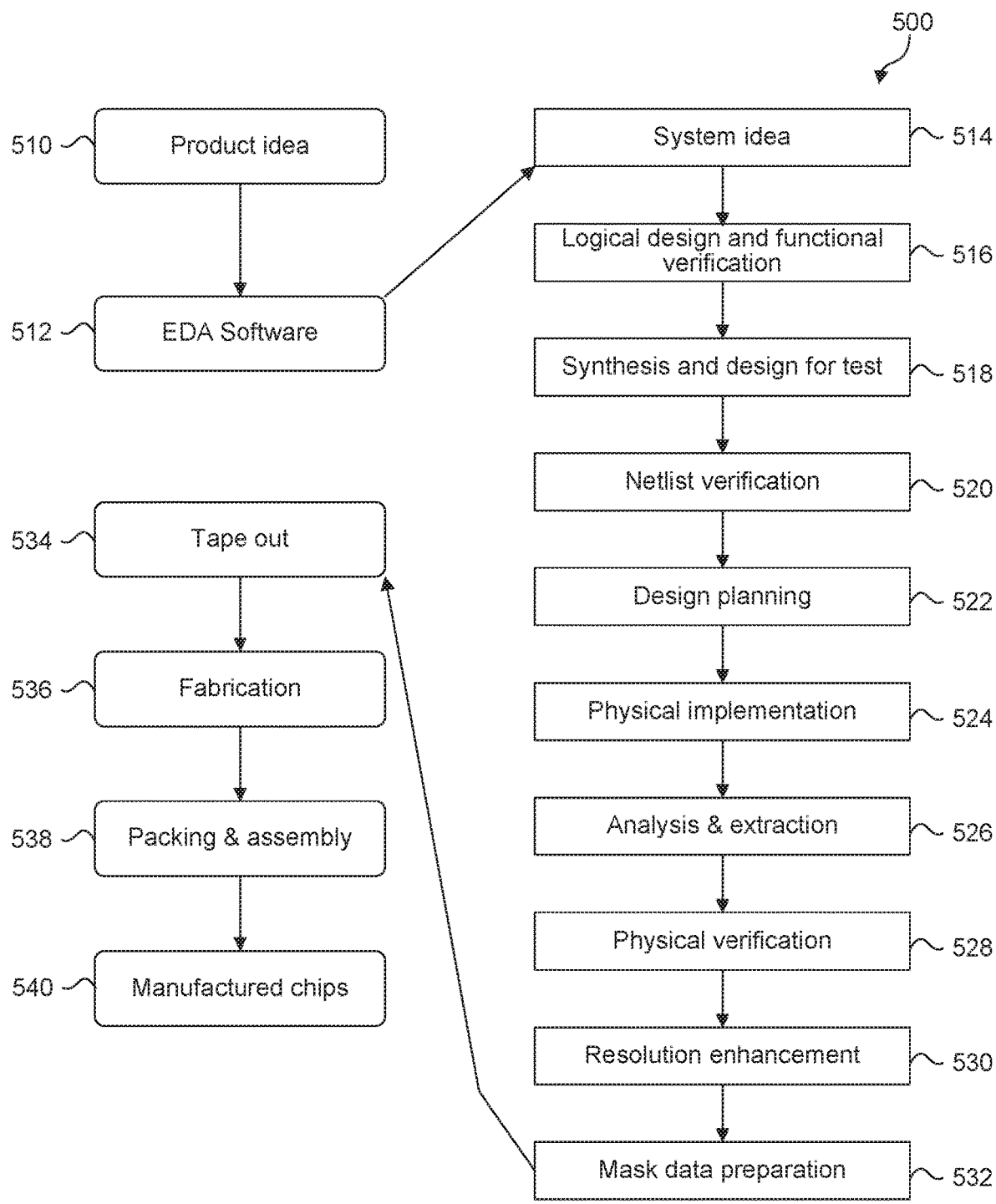
FIG. 5 depicts a flowchart of various operations in the design and fabrication of an integrated circuit in accordance with an embodiment of the present disclosure.

FIG. 5 depicts a flowchart of various operations 500 in the design and fabrication of an integrated circuit in accordance with an embodiment of the present disclosure. Each of these processes can be structured and enabled as multiple modules or operations. The term 'EDA' signifies the term 'Electronic Design Automation.' These processes start with the creation of a product idea 510 with information supplied by a designer, information that is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536, and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described by being enabled by EDA products (or tools).

During system design 514, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 516, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 518, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for the production of lithography masks. During mask data preparation 532, the 'tape-out' data is used to produce lithography masks that are used to produce finished integrated circuits.

A storage subsystem of a computer system (such as computer system 610 of FIG. 6A) may be used to store the programs and data structures that are used by some or all of the EDA products described herein, and products used for the development of cells for the library and for the physical and logical design that use the library.

Figure 6A:
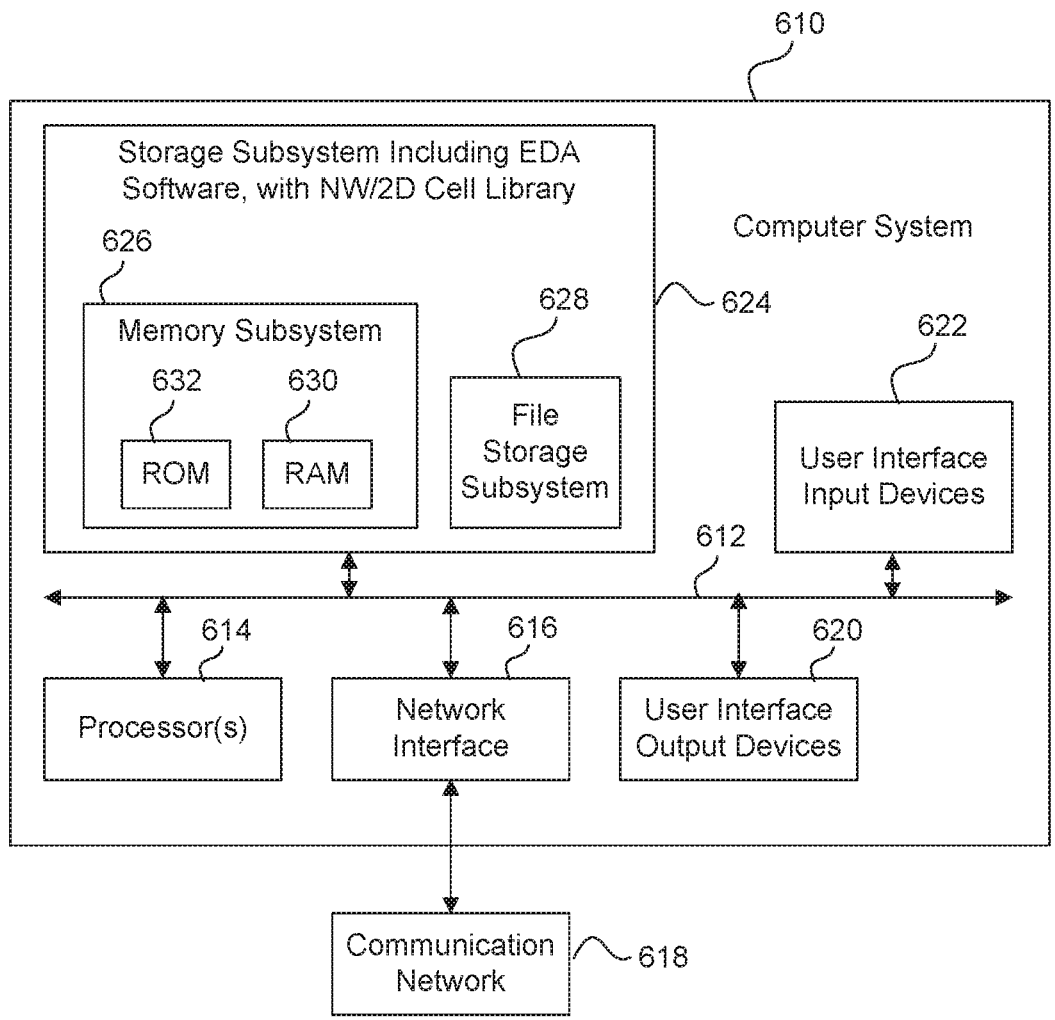
FIGS. 6A, 6B and 6C depict simplified block diagrams of a computer system suitable for use with embodiments of the technology, as well as circuit design and circuit embodiments of the technology.
Figures 6B, 6C:
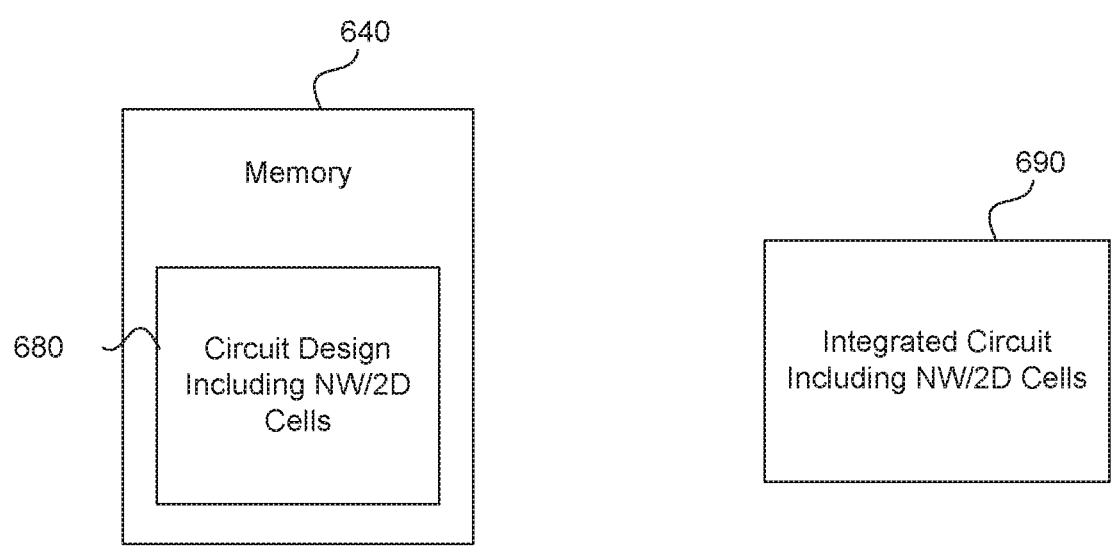

FIGS. 6A, 6B and 6C are simplified block diagrams of a computer system suitable for use with embodiments of the technology, as well as circuit design and circuit embodiments of the technology.

In FIG. 6A, computer system 610 typically includes at least one computer or processor 614 which communicates with a number of peripheral devices via bus subsystem 612. Typically, the computer can include, or the processor can be, any of a microprocessor, graphics processing unit, or digital signal processor, and their electronic processing equivalents, such as an Application Specific Integrated Circuit ('ASIC') or Field Programmable Gate Array ('FPGA'). The terms 'processor' and 'computer' are further defined below. These peripheral devices may include a storage subsystem 624, including a memory subsystem 626 and a file storage subsystem 628, user interface input devices 622, user interface output devices 620, and a network interface subsystem 616. The input and output devices allow user interaction with computer system 610.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine capable of executing instructions (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the present disclosure are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 610 depicted in FIG. 6A is intended only as one example for purposes of illustrating the preferred embodiments. Many other configurations of computer system 610 are possible having more or fewer components than the computer system depicted in FIG. 6A.

Network interface subsystem 616 provides an interface to outside networks, including an interface to communication network 618, and is coupled via a communication network 618 to corresponding interface devices in other computer systems or machines. Communication network 618 may include many interconnected computer systems, machines and communication links. These communication links may be wireline links, optical links, wireless links, or any other devices for communication of information. Communication network 618 can be any suitable computer network, for example, a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 622 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term 'input device' is intended to include all possible types of devices and ways to input information into computer system 610 or onto communication network 618. User interface input devices typically allow a user to select objects, icons, text and the like that appear on some types of user interface output devices, for example, a display subsystem.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term 'output device' is intended to include all possible types of devices and ways to output information from computer system 610 to the user or to another machine or computer system.

Memory subsystem 626 typically includes several memories including a main random-access memory ('RAM') 630 (or other volatile storage devices) for storage of instructions and data during program execution and a read only memory ('ROM') 632 in which fixed instructions are stored. File storage subsystem 628 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 628.

Bus subsystem 612 provides a device for letting the various components and subsystems of computer system 610 communicate with each other as intended. Although bus subsystem 612 is shown schematically as a single bus, alternative embodiments of the bus subsystem may use multiple busses. For example, RAM-based main memory can communicate directly with file storage systems using Direct Memory Access ('DMA') systems.

FIG. 6B depicts a memory 640 such as a non-transitory, computer readable data and information storage medium 680 associated with file storage subsystem 628, and/or with network interface subsystem 616, and can include a data structure specifying a circuit design. The memory 640 can be a hard disk, a floppy disk, a CD-ROM, an optical medium, removable media cartridge, or another medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 6C signifies an integrated circuit 690 created with the described technology that includes one or more cells selected, for example, from a cell library.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method, comprising:
    identifying a sub-circuit that drives a net from a plurality of nets in a circuit;
    generating previous cycle variables for a plurality of inputs of the sub-circuit
    generating, by a computer processor, a glitch detection circuit comprising dual-rail encoding from the net to a signal driver of the sub-circuit and configured to detect a glitch type by generating a glitch modeling output as a function of at least a value of the net and a previous value of the net, wherein generating the glitch detection circuit further comprises:
    generating a high rail net value of the glitch detection circuit based on the plurality of inputs to the sub-circuit, and
    generating a low rail net value of the glitch detection circuit based on the previous cycle variables;
    modifying the sub-circuit to include the glitch detection circuit having the low rail net value and the high rail net value;
    generating a hardware design language (HDL) output file associated with a resynthesized netlist of the modified sub-circuit; and
    performing a simulation or a formal verification, of the HDL output file to determine whether a signal associated with the net glitches.

2. The method of claim 1, wherein the dual-rail encoding is based on a functional expression and the functional expression is defined in the HDL output file.

3. The method of claim 2, wherein the HDL output file is optimized for readability and to minimize the number of lines in the HDL output file.

4. The method of claim 1, wherein generating the HDL output file includes:
    resynthesizing a netlist of an initial HDL output file; and
    converting the initial HDL output file from a first format to a second format.

5. The method of claim 1, wherein generating the HDL output file includes:
    segregating an initial HDL output file into two or more sections; and
    modifying a signal name as a function of an associated respective section of the two or more sections.

6. The method of claim 1, wherein the net is connected to a reset pin of a device.

7. The method of claim 1, wherein modifying the sub-circuit includes:
    providing an input value to the glitch detection circuit based on a preset condition.

8. The method of claim 7, wherein providing the input value to the glitch detection circuit comprises:
    setting the input value to the glitch detection circuit to a NULL state when a previous value and a current value of the input value of the sub-circuit are different.

9. The method of claim 1, further comprising:
    setting an input value to the glitch detection circuit to a zero input when a previous value of the input value to the glitch detection circuit is equal to a current value of the input value to the glitch detection circuit, the previous value being equal to zero; and
    setting the input value to the glitch detection circuit to a one input when the previous value of the input value to the glitch detection circuit is equal to the current value of the input value to the glitch detection circuit, the previous value being equal to one.

10. The method of claim 1, wherein modifying the sub-circuit includes:
    determining that a glitch occurred when an output of the glitch detection circuit switches from a de-asserted state to an asserted state.

11. The method of claim 1, further comprising:
    generating an abstract port associated with a primary input; and
    associating a clock to the abstract port.

12. The method of claim 11, wherein the clock is a virtual clock when a block associated with the primary input is abstracted out and is not available.

13. The method of claim 1, further comprising encoding the HDL output file.

14. The method of claim 1, wherein an input value of the glitch detection circuit is based on a current value and a previous value of the input value.

15. The method of claim 1, wherein modifying the sub-circuit includes:
    setting an input value to the glitch detection circuit to a previous value of the input value of the glitch detection circuit when the previous value and a current value of the input value are equal.

16. A system comprising:
    a memory storing instructions; and
    a processor, coupled with the memory and to execute the instructions, the instructions when executed cause the processor to:

identify a sub-circuit that drives a net from a plurality of nets in a circuit, generate previous cycle variables for a plurality of inputs of the sub-circuit, generate a glitch detection circuit comprising dual-rail encoding from the net to a signal driver of the sub-circuit and configured to detect a glitch type by generating a glitch modeling output as a function of at least a value of the net and a previous value of the net, generate a high rail net value of the glitch detection circuit based on the plurality of inputs to the sub-circuit, generate a low rail net value of the glitch detection circuit based on the previous cycle variables, modify the sub-circuit to include the glitch detection circuit having the low rail net value and the high rail net value, generate a hardware design language (HDL) output file associated with a resynthesized netlist of the modified sub-circuit, and perform a simulation or a formal verification of the HDL output file to determine whether a signal associated with the net glitches.

17. The system of claim 16, wherein the dual-rail encoding is based on a functional expression and the functional expression is defined in the HDL output file.

18. The system of claim 16, wherein the processor is further configured to:

generate an abstract port associated with a primary input; and associate a clock to the abstract port.

19. A method, comprising:

identifying a sub-circuit that drives a net from a plurality of nets in a circuit;

generating an abstract port for a signal driver of the sub-circuit when the signal driver is associated with a primary port of the circuit;

generating previous cycle variables for a plurality of inputs of the sub-circuit;

generating, by a computer processor, a glitch detection circuit comprising dual-rail encoding from the net to the signal driver of the sub-circuit and is configured to detect a glitch type by generating a glitch modeling output as a function of at least a value of the net and a previous value of the net, wherein generating the glitch detection circuit further comprises:

generating a high rail net value of the glitch detection circuit based on the plurality of inputs to the sub-circuit, and generating a low rail net value of the glitch detection circuit based on the previous cycle variables;

modifying the sub-circuit to include the glitch detection circuit having the low rail net value and the high rail net value; and performing one of a simulation and a formal verification of the output file to determine whether a signal associated with the net glitches.

\* \* \* \* \*